United States Patent [19]
Grimelii

[11] 3,747,288
[45] July 24, 1973

[54] DOUBLE ANCHORAGE CLAMP

[76] Inventor: Nardie F. Grimelii, 2060 Garfield St., Hollywood, Fla. 33020

[22] Filed: Oct. 8, 1971

[21] Appl. No.: 187,753

[52] U.S. Cl............... 52/23, 24/269, 52/148, 52/149
[51] Int. Cl............................... E04h 12/20
[58] Field of Search................ 52/23, 3–5, 52/446, 148–152; 24/269, 243; 248/361

[56] References Cited
UNITED STATES PATENTS

| | | | |
|---|---|---|---|
| 3,416,763 | 12/1968 | Moreno | 248/361 A |
| 600,401 | 3/1898 | Brisbin | 52/149 |
| 614,581 | 11/1898 | Shown | 52/148 |
| 3,054,151 | 9/1962 | Shankland | 52/23 |
| 3,335,531 | 8/1967 | Grimelli | 52/23 |
| 3,533,588 | 10/1970 | Cregier | 248/361 A |
| 3,673,642 | 7/1972 | Harwell | 24/269 |
| 1,131,053 | 3/1915 | Garland | 151/34 |

FOREIGN PATENTS OR APPLICATIONS

| | | | |
|---|---|---|---|
| 333,329 | 2/1921 | Germany | 24/269 |
| 771,264 | 3/1957 | Great Britain | 24/269 |
| 677,389 | 11/1964 | Italy | 24/243.9 |

Primary Examiner—Frank L. Abbott
Assistant Examiner—Henry E. Raduazo
Attorney—Salvatore G. Militana

[57] ABSTRACT

A tie-down apparatus having a double anchorage clamp for metal straps, cables, chains and the like in tying down a house trailer or materials such as pipe, tubing and lumber having a U-shape body member with a pair of bolts extending through bores in the body member; one of the bolts having a slot extending axially from the threaded end portion and terminating adjacent the other for receiving a tie-down strap and the other bolt having a radially disposed opening at its midportion for receiving a cable. On the outer surface of body member adjacent the bores are shoulder members which abut against the head of the bolts to prevent the rotational movement of the bolts and a locking lever plate having two openings receiving the heads of the bolts. The locking lever plate being used as both a tool to rotate the bolts and as a restraining member for preventing the rotation of the bolts when placed over the head of the bolts. The ends of the tie-down strap or cable extend to and are secured to a pair of locking brackets which are adapted to be mounted on the undercarriage of the trailer. Upon rotating the bolt with the locking tool, the strap or cable becomes tightened about the trailer.

1 Claim, 6 Drawing Figures

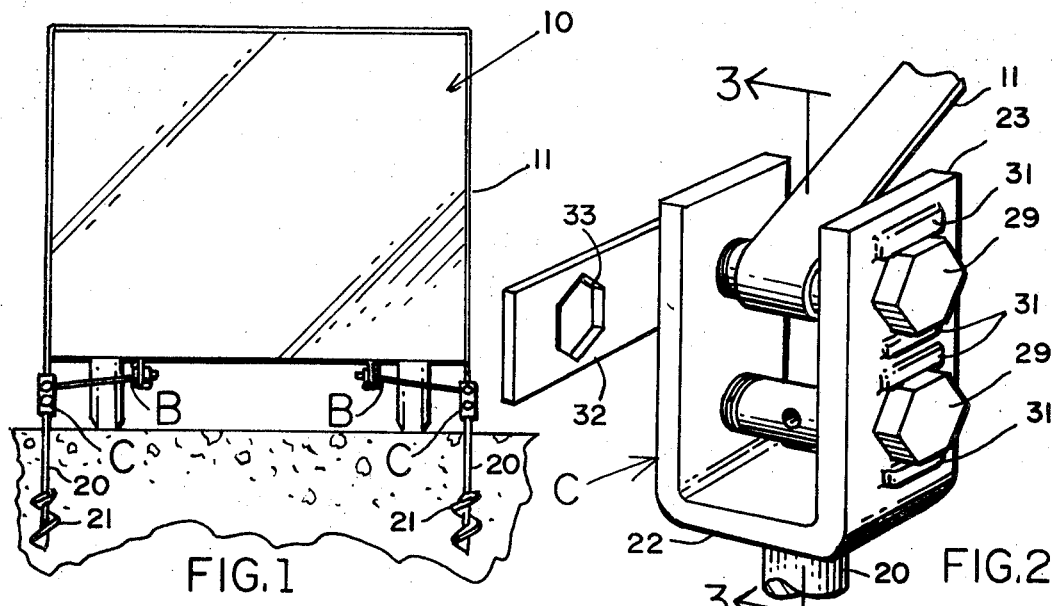
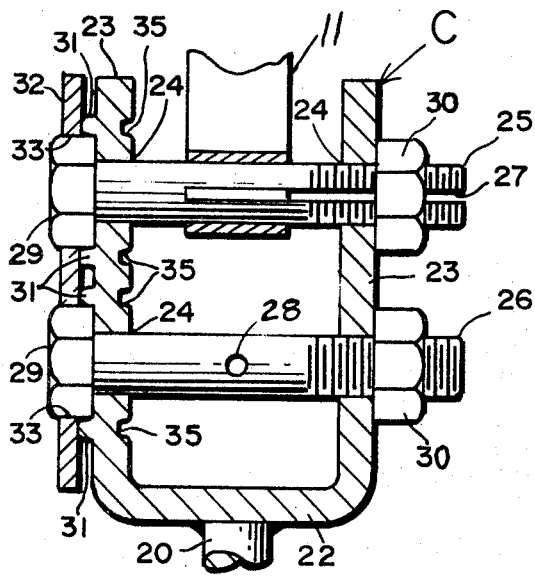
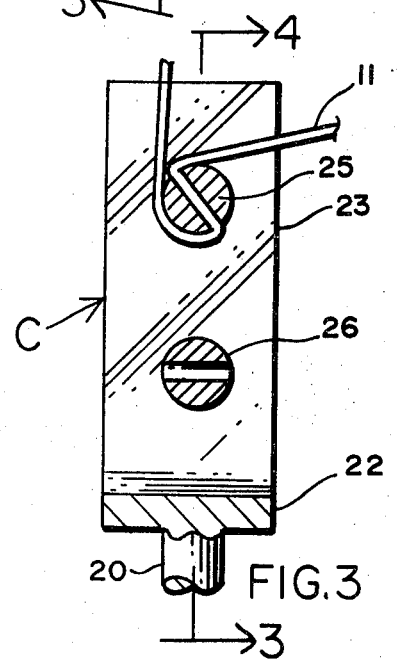
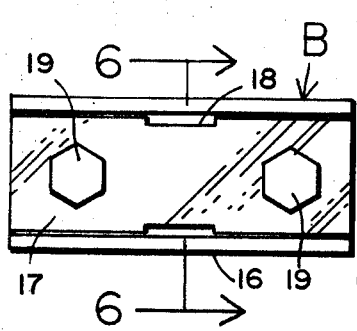
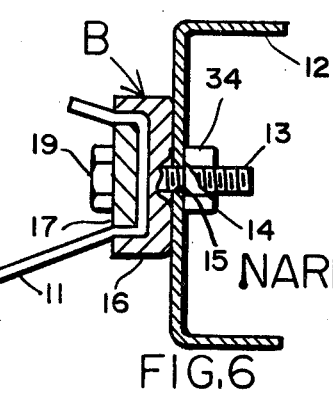
INVENTOR
NARDIE F. GRIMELLI
BY Salvatore G. Militara,
ATTORNEY

DOUBLE ANCHORAGE CLAMP

CROSS REFERENCES TO RELATED APPLICATIONS

This invention is an improvement over applicant's U.S. Pat. No. 3,335,531 which issued on Aug. 15, 1967, for TIE - DOWN FOR HOUSE TRAILERS OR THE LIKE.

BACKGROUND OF THE INVENTION

1. Field of the Invention

This invention relates to brackets for fastening metal straps, cables and chains thereto, which are adapted particularly as tie-downs for house trailers, airplanes and the like as well as securing a pile of stacked lumber, pipes and drums on flat bed railroad cars, trucks, etc.

2. Description of the Prior Art

At the present time, when tying down house trailers, airplanes, boats and the like or when securing a load or pile of lumber, tubing, pipes, etc. a length of metal strap is extended over the material and the ends of the strap are secured to an anchored member by crimping or otherwise distorting the strap. Consequently, when the metal strap has to be removed from its tie down position, it must be cut and thereby becomes non-reusable. Since metal strap is relatively expensive, the cost of typing down an item such as a house trailer which is susceptible of being moved often to new localities, becomes prohibitive to cause persons to resort to using less effective tie down materials as a substitute for the metal strap.

SUMMARY OF THE INVENTION

Accordingly a primary object of the present invention is to provide a tie-down apparatus having a double anchorage clamp for tying down house trailers, stacks of lumber, pipes, drums, etc., wherein the metal straps used to tie down the material are not twisted nor destroyed so that they may be reused as many times as desired.

Another object of the present invention is to provide a double anchorage clamp for tying down purposes that permits use of metal straps, cables or chains or a combination of any two.

A further object of the present invention is to provide a double anchorage clamp anchored to the ground for tying down a house trailer and the like in combination with a locking bracket that is fastened to the frame or carriage of the house trailer whereby the ends of a metal strap that extend about the roof of the trailer are secured in the locking bracket and the anchorage clamp engages the strap intermediate its ends to tighten the strap and secure the house trailer against tipping or lateral movement.

A still further object of the present invention is to provide a double anchorage clamp with automatic restraining means for preventing a tightened tying down member from becoming released inadvertently and a tool for both tightening the member and serving as a locking member after tightening the tying down member.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

BRIEF DESCRIPTION OF THE DRAWING

In the drawing:

FIG. 1 is an end view of a conventional mobile home showing the manner of tying down the trailer with use of my clamp and bracket system.

FIG. 2 is a perspective view of the anchorage clamp showing the use of the locking plate as a tool for tightening the strap on the clamp pin.

FIG. 3 is a cross sectional view taken along the line 3—3 of FIG. 2.

FIG. 4 is a cross sectional view taken along the line 4—4 of FIG. 3.

FIG. 5 is a plan view of my strap locking clamp alone.

FIG. 6 is a cross sectional view taken along the line 6—6 of FIG. 5 showing the clamp fastened to the trailer frame with the strap fastened therein.

DESCRIPTION OF THE PREFERRED EMBODIMENT

Referring to the drawing wherein like numerals are used to designate similar parts throughout the several views, the numeral 10 refers to a conventional mobile home in which a metal strap 11 is built in the body of the mobile home 10 and extends about the complete body thereof from one side to the other. The free ends of the strap 11 normally extend beyond the lower surface of the trailer 10 on each side thereof intended to be fastened by the owner of the trailer to a tie-down device which secures the house trailer 10 against lateral movement or tipping due to high winds and the like.

The free ends of the strap 11 are secured by a bracket —B— that is fastened to the channel frame member 12 by a bolt 13 on which a nut 14 is threaded. The bolt 13 which extends through a bore 15 in the frame 12 is welded to a U-shaped base member 16 in which a locking plate 17 is received. The locking plate 17 is slotted along both edges at the mid-portion thereof as at 18 to permit the strap 11 to extend therealong and between the base member 16 and locking plate 17. The locking plate 17 is fastened tightly to the base member 16 to prevent the slippage of the strap 11 therethrough by bolts 19 that extend through matching bores in the members 16, 17 and frame 12. The bolts 19 are provided with nuts 34.

With the free ends of the strap 11 secured to the frame 12 by the brackets —B— the intermediate portion of the straps 11 is secured to the clamps —C— having rods 20 that extend into the ground and are fastened to anchor plates 21 embedded into the earth. The brackets —B— serve a double function as is explained in greater detail hereinafter to tighten the strap 11 so as to leave no slack on the strap 11 between the brackets —B— and clamps —C—. The clamps —C— consist of a base member 22 to which the rod 20 is welded and with upwardly extending leg portions 23 forming a U-shaped member. The leg portions 23 are provided with a pair of aligned bores 24 for receiving bolts 25 and 26 having head portions 29. The bolt 25 is slotted as at 27 along the axis of the bolt, the slot 27 extending from the threaded end to beyond the mid-portion of the bolt 25 as best shown by FIG. 4, while the threaded bolt 26 is provided with a bore 28 at its mid-portion. The bolts 25 and 26 are prevented from turning by shoulder members 31 formed on the outer surface of one of the leg portions 23, the shoulder members 31 engaging the head 29 of the bolts 25, 26. The shoulder members 31 are preferably formed by a stamping operation that presses the metal of the leg portions 23 outwardly to leave an indentation 35 on the inner surface thereof. In addition to the shoulder members 31 that prevent the rotation of the bolts 25, 26, there is a locking lever plate 32 that is provided with openings 33 that are shaped to receive the heads 29 of the bolts 25, 26 as shown by FIG. 4. The locking lever plate 32 may be used as a tool for tightening the straps 11 as is explained hereinafter. Nuts 30 threaded on the bolts 25, 26 secure the bolts in the locking clamps —C—.

In the normal use of my double anchorage clamp for use in tying down the house trailer 10 the anchor plates 21 are embedded into the earth directly below the sides of the house trailer in alignment with the downwardly extending straps 11 with anchorage clamps —C— positioned above the ground. Appropriate bores 15 are drilled in the frame 12 of the trailer 10 to receive the bolt 13 on which the nut 14 is tightened to secure the base member 16 of the brackets —B— in position. The free end of the strap 11 is placed in the base member 16 against the strap 11 and nuts 34 tightened on the bolts 19 to secure the strap 11 against any slippage therein.

Now, the bolts 25 are slid part way out of the clamp —C— so that the free end of the bolt 25 is positioned between the leg portions 23. The strap 11 is then placed between the leg portions 23 and inserted it into the slot 27 at the free end of the bolt 25 and sliding the strap 11 axially to the end of the slot 27. The bolt 25 is now inserted into the bore 24, slid laterally until the head 29 engages the outer surface of the leg portion 23 and the shoulders 23. The locking cover plate 32 is removed from the position shown by FIG. 4 and used as a tool for rotating the bolt 25 as shown by FIG. 2. The slack in the strap 11 between the clamp —C— and the trailer body 10 and the slack between the clamp —C— and the bracket —B— must now be equalized. If necessary, the locking plate 17 may be loosened in the bracket —B— to permit equalizing the tension in the strap 11 throughout its full length. Then the bolt 25 is rotated by means of the locking lever plate 32 until the strap 11 is placed under the desired holddown tension. The bolt 25 is hammered inwardly to cause the head 29 to engage the shoulders 31 and prevent any reverse rotation of the bolt 25. The nut 33 is tightened on the bolt 25 by use of the locking lever plate 32 and the latter is returned to its locking position on the heads 29 of the bolts 25 and 26. The house trailer 10 is now fastened securely against any lateral movement or tipping action that might occur otherwise in high winds such as hurricanes and tornadoes.

As can readily be noted, the use of my clamps —C— and brackets —B— do not result in the distortion, destruction nor twisting of the metal strap 11 so that the strap 11 may be reused as often as desired. In the instance of tying down a mobile home or trailer, there are many occasions for removing the trailer from one place to another. Each time the trailer is moved to a new location, the metal strap 11 can be removed from the brackets —B— and clamp —C— and replaced thereon at the new locality.

In the event a cable or chain is used in tying down a house trailer rather than metal straps 11, the bolt 26 is utilized in the same manner as the bolt 25 with the cable extending through an opening in the bolt 26.

In the use of my double anchorage clamp —C— for tying down piled pipes, tubing, lumber and the like, the clamps —C— used without the brackets —B—. In this instance, my clamps —C— would be bolted, welded or otherwise secured to the sides of a bed or platform on which the material is stacked. A strap which extends over the pile or material is secured at its ends to the clamps —C— in the same manner described hereinabove.

What I claim as new and desire to secure by Letters Patent is:

1. A tie-down apparatus comprising an anchorage clamp for receiving straps in tying down house trailers and the like having a base member, upwardly extending leg portions in substantially parallel and spaced relation mounted on said base portion, said leg portions having a pair of aligned bores, a threaded bolt having a head portion extending through said bores, shoulder means mounted on the outer surface of one of said leg portions engaging said head portion for preventing the rotation of said bolt, said bolt having a slot extending from one side to the other side along the axis of said bolt, said slot commencing at the threaded end of said bolt and terminating beyond substantially the midportion of said bolt for receiving a metal tie down strap and means securing said base member, said leg portions having a second pair of aligned bores, a second threaded bolt having a head mounted on said last named bores, further shoulder means mounted on said one of said leg portions engaging said head of said second threaded bolt, said second threaded bolt having a radially disposed opening at substantially the midportion thereof and a locking bracket adapted to be mounted on a frame of the house trailer having a U-shaped base member, bolt means extending from said base member and secured to said frame, a locking plate having slotted portions along opposed edges thereof for receiving the free end of said strap and means securing said strap between said locking plate and said base member and preventing the slippage of said strap therebetween.

* * * * *